United States Patent [19]

Pirl

[11] Patent Number: 5,491,317
[45] Date of Patent: Feb. 13, 1996

[54] SYSTEM AND METHOD FOR LASER WELDING AN INNER SURFACE OF A TUBULAR MEMBER

[75] Inventor: William E. Pirl, Levelgreen, Pa.

[73] Assignee: Westinghouse Electric Corporation, Pittsburgh, Pa.

[21] Appl. No.: 126,212

[22] Filed: Sep. 13, 1993

[51] Int. Cl.$^6$ .................................................... B23K 26/00
[52] U.S. Cl. .................. 219/121.64; 219/121.63
[58] Field of Search ................... 219/121.63, 121.64, 219/60.2

[56] References Cited

U.S. PATENT DOCUMENTS

| | | |
|---|---|---|
| 4,694,137 | 9/1987 | Hawkins et al. . |
| 4,736,092 | 4/1988 | Pirl et al. . |
| 4,814,702 | 3/1989 | Driggers et al. . |
| 4,827,098 | 5/1989 | Kasner et al. . |
| 4,839,495 | 6/1989 | Kitera et al. . |
| 4,983,796 | 1/1991 | Griffaton . |
| 5,006,268 | 4/1991 | Griffaton . |
| 5,066,846 | 11/1991 | Pirl . |
| 5,097,110 | 3/1992 | Hamada et al. . |
| 5,117,086 | 5/1992 | Boudot et al. . |
| 5,132,508 | 7/1992 | Vignes et al. . |
| 5,182,429 | 1/1993 | Pirl et al. . |

FOREIGN PATENT DOCUMENTS

92/03248  7/1991  WIPO ............................. B23K 26/00

*Primary Examiner*—Clifford C. Shaw
*Attorney, Agent, or Firm*—Walter S. Stevens

[57] ABSTRACT

System and method for laser welding an inner surface of a tubular member, which tubular member may be a repair sleeve disposed in a nuclear heat exchanger heat transfer tube. The system includes a laser for generating high intensity laser light sufficient to fuse the sleeve to the inside diameter of the heat exchanger tube, the tube being of the type typically found in nuclear heat exchangers. A fiber-optic cable is optically coupled to the laser for conducting the laser light therethrough. The fiber-optic cable has a predetermined configuration to homogenize the laser light so that the laser light obtains the desired spatial coherency as the light is emitted from the fiber-optic cable. A mirror is optically coupled to the fiber-optic cable so as to receive the homogenized light beam emitted from the fiber-optic cable. The mirror is also optically coupled to the inner diameter of the sleeve for reflecting the homogenized light beam onto the inner diameter of the sleeve to weld or fuse the sleeve to of the tube. In this manner, the sleeve is welded to the inside diameter of the tube to sleeve the tube.

28 Claims, 7 Drawing Sheets

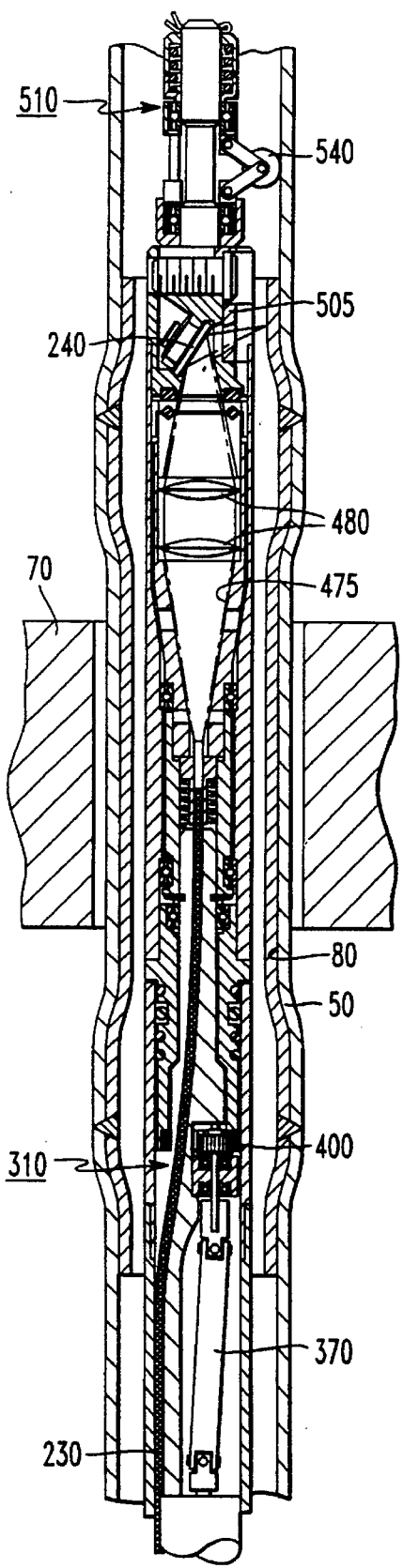
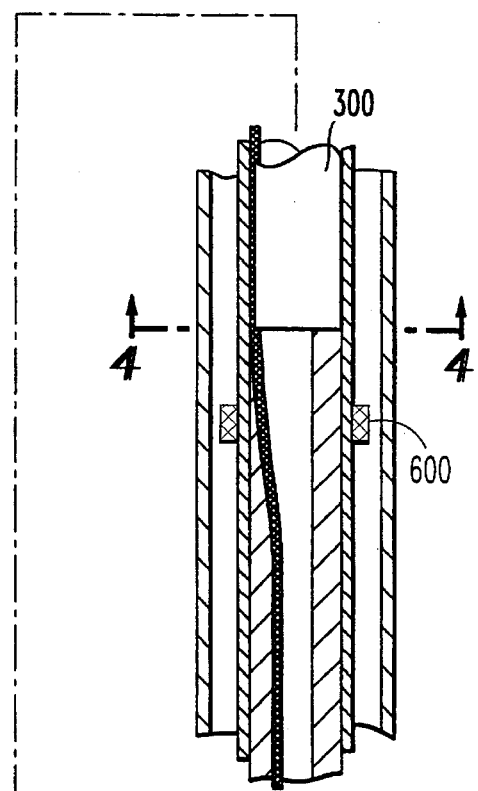
FIG. 3

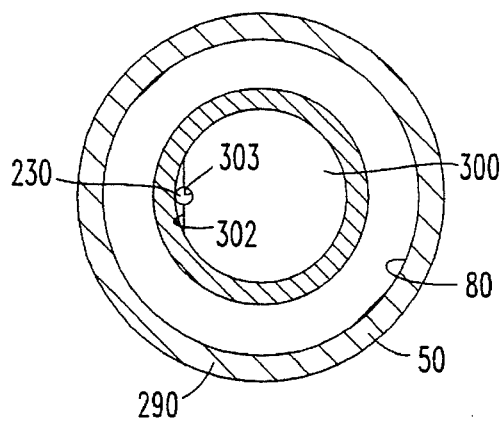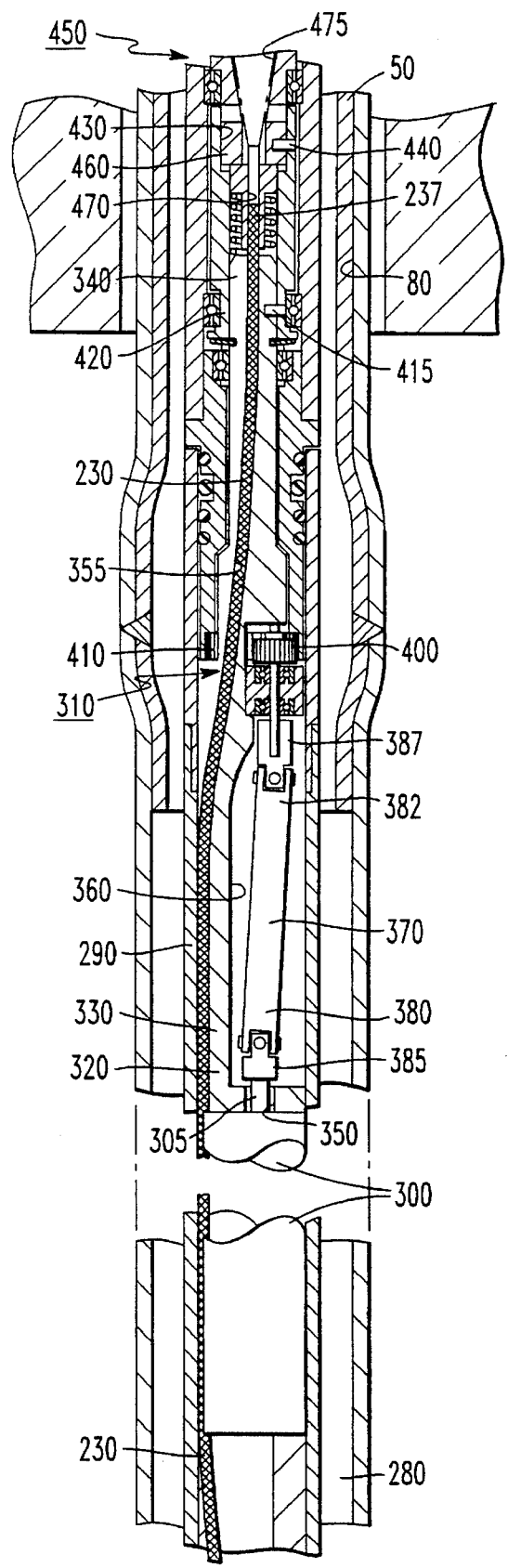

SYSTEM AND METHOD FOR LASER WELDING AN INNER SURFACE OF A TUBULAR MEMBER

BACKGROUND

This invention generally relates to welding apparatus and methods and more particularly relates to a system and method for laser welding an inner surface of a tubular member, which tubular member may be a repair sleeve disposed in a nuclear heat exchanger heat transfer tube.

Although laser welding apparatus and methods are known, it has been observed that such apparatus and methods have a number of operational problems associated with them that make these apparatus and methods less than completely satisfactory for welding an inner surface of a tubular member, which tubular member may be a repair sleeve disposed in a nuclear heat exchanger heat transfer tube. However, before these problems can be appreciated, some background is desirable as to the structure and operation of a typical nuclear heat exchanger.

In a typical nuclear heat exchanger or steam generator, a heated and radioactive primary fluid flows through a plurality of U-shaped tubes, each of the tubes having a fluid inlet and a fluid outlet end. The inlet and outlet ends of the tubes are received through holes in a tubesheet disposed in the heat exchanger. The heat exchanger defines an inlet plenum chamber below the tubesheet, which inlet plenum chamber is in communication with the inlet ends of the tubes. The heat exchanger also defines an outlet plenum chamber below the tubesheet and isolated from the inlet plenum chamber, the outlet plenum chamber being in communication with the outlet ends of the tubes. During operation of the heat exchanger, a heated and radioactive primary fluid flows into the inlet plenum chamber and enters the inlet ends of the tubes to flow through the tubes. The primary fluid then flows through the outlet ends of the tubes and into the outlet plenum chamber. The primary fluid next flows out the outlet plenum chamber to exit the heat exchanger. A nonradioactive secondary fluid having a temperature less than the primary fluid simultaneously surrounds the exterior surfaces of the tubes above the tubesheet as the primary fluid flows through the tubes. As the primary fluid flows through the tubes, it gives-up its heat to the secondary fluid surrounding the exterior surfaces of the tubes to produce steam that is used to generate electricity in a manner well known in the art.

Because the primary fluid is radioactive, the heat exchanger is designed such that the radioactive primary fluid flowing through the tubes does not commingle with and radioactively contaminate the nonradioactive secondary fluid surrounding the exterior surfaces of the tubes. Therefore, the tubes are designed to be leak-tight so that the radioactive primary fluid remains separated from the nonradioactive secondary fluid to avoid commingling the primary fluid with the secondary fluid.

Occasionally, due to tube wall intergranular cracking caused by stress and corrosion during operation of the heat exchanger, the heat exchanger tubes may degrade and thus may not remain leak-tight. Therefore, it is desirable to inspect the tubes to detect any tubes that may have experienced such stress corrosion cracking or degradation. This inspection is typically performed by inserting an inspection probe, such as an eddy current probe or an ultrasonic probe, into the tube and moving the probe along the interior surface of the tube. If the inspection probe indicates that stress corrosion cracking is present or eminent at a particular location, then the tube is "sleeved" at that location. When sleeving is performed, a tubular sleeve is inserted into the tube, so as to cover the degraded portion of the tube, and affixed thereto typically by expanding the sleeve into intimate engagement with the tube. The sleeve is expanded into engagement with the tube by any of several means known in the art, such as by hydraulic expansion, hard rolling or by other expansion techniques. In this manner, the sleeved tube remains in service although degraded.

However, the elastic properties of the sleeve may cause the sleeve to experience "spring back" after expansion. This phenomenon of "spring back" will in turn cause a relatively small gap to exist at the sleeve-to-tube interface. Such a gap is undesirable because the gap defines a flow path between the sleeve and the tube, which flow path may allow the primary fluid to undesirably commingle with the secondary fluid. Therefore, it is desirable to fuse the sleeve to the tube by forming, for example, two spaced-apart weldments circumscribing the sleeve in order to seal the gap and the flow path defined thereby. Relatively small sized gaps are sealed by braze welding. However, laser welding is preferred to seal gaps of relatively larger size (e.g., gaps of up to approximately 0.008 inch). Moreover, brazing requires precleaning, such as by honing the surface of the sleeve to remove any surface oxidation in order to provide uniform braze flow. Laser welding, on the other hand, obviates the need for surface precleaning.

An Nd:YAG laser is commonly used for fusing the sleeve to the tube by means of a laser beam. However, when an Nd:YAG laser is used to generate the laser beam, the laser beam may have a relatively large divergent angle of approximately 20–30 mrad, thereby causing difficulty in precisely confining the laser beam to the relatively small predetermined area of the sleeve to be welded. Therefore, a problem in the art is to provide a laser beam, such as a laser beam generated by an Nd:YAG laser, that is capable of being precisely confined.

Moreover, the laser beam generated by the Nd:YAG laser generally has less than fully acceptable spatial coherency, thereby resulting in a laser beam not having the desired high power density as it welds the sleeve. Less than desirable power density may result in a weldment that does not completely fuse the sleeve to the tube. Therefore, another problem in the art is to provide a laser beam, such as a laser beam generated by an Nd:YAG laser, that has a high power density.

Moreover, the typical laser welding apparatus uses at least one mirror to reflect the laser beam onto the sleeve and at least one lens to focus the laser beam onto the mirror. However, the mirror and lens are susceptible to fouling by weld spatter and by microscopic debris entrained in a weld plume produced during the welding process. In addition, such weld spatter and weld plume debris obstruct the laser beam as the laser beam travels through the lens to the mirror. Such fouling of the mirror and lens is undesirable because such fouling will shorten the useful life of the mirror and lens and will interfere with the ability of the welding apparatus to satisfactorily perform its welding function. Although a shielding gas, such as oxygen, hydrogen or the like, is forced over the mirror and lens in prior art laser welding devices to mitigate the effects of fouling and beam obstruction, it has been observed by applicant that such forced gas flow may be less than totally effective. Therefore, yet another problem in the art is to perform the laser welding process in such a manner that the mirror and lens are less susceptible to fouling and so that the laser beam is not as easily obstructed.

A laser welding head for welding a sleeve within a tube by fusing the interface between the sleeve and tube with a laser beam is disclosed in U.S. Pat. No. 4,694,137 issued Sep. 15, 1987 in the name of Phillip J. Hawkins, et al. titled "Laser Welding Head For Sleeve-To-Tube Welding" and assigned to the assignee of the present invention. However, this patent does not appear to disclose a solution to the problem of providing a laser beam that is precisely confined and that has the desired high power density. In addition, this patent does not appear to disclose a laser welding apparatus that satisfactorily reduces fouling of the mirror and lens during the welding process.

A system and method for laser welding the inner surface of a metallic tube is disclosed in U.S. Pat. No. 5,066,846 issued Nov. 19, 1991 in the name of William E. Pirl titled "System And Method For Laser Welding The Inner Surface Of Heat Exchanger Tubes" and assigned to the assignee of the present invention. However, this patent does not appear to disclose a solution to the problem of providing a laser beam that is precisely confined and that has the desired high power density. In addition, this patent does not appear to disclose a laser welding apparatus that satisfactorily reduces fouling of the mirror and lens during the welding process.

Therefore, what is needed are a system and method for suitably laser welding an inner surface of a tubular member, which tubular member may be a repair sleeve disposed in a nuclear heat exchanger heat transfer tube.

SUMMARY

Disclosed herein are a system and method for laser welding an inner surface of a tubular member, which tubular member may be a repair sleeve disposed in a nuclear heat exchanger heat transfer tube. The system includes a laser for generating high intensity laser light sufficient to fuse the sleeve to the inside diameter of the heat exchanger tube, the tube being of the type typically found in nuclear heat exchangers. A fiber-optic cable is optically coupled to the laser for conducting the laser light therethrough. The fiber-optic cable has a predetermined configuration to homogenize the laser light so that the laser light obtains the desired spatial coherency as the light is emitted from the fiber-optic cable. A mirror is optically coupled to the fiber-optic cable so as to receive the homogenized light beam emitted from the fiber-optic cable. The mirror is also optically coupled to the inner diameter of the sleeve for reflecting the homogenized light beam onto the inner diameter of the sleeve to weld or fuse the sleeve to the inside diameter of the tube. In this manner, the sleeve is fused to the inside diameter of the tube to sleeve the tube.

In its broad form, the invention is a system for welding an inner surface of a tubular member, comprising laser light generating means for generating high intensity laser light; light conducting means optically coupled to said laser light generating means for conducting the laser light through said light conducting means, said light conducting means configured to homogenize the light for emitting a homogenized light beam therefrom; and light reflecting means optically coupled to said light conducting means for receiving the homogenized light beam emitted from said light conducting means and optically coupled to the inner surface of the tubular member for reflecting the light beam onto the inner surface to weld the inner surface.

In its broad form, the invention is also a method of welding an inner surface of a tubular member, comprising the steps of generating high intensity laser light by operating laser light generating means; emitting a homogenized light beam by conducting the light through light conducting means configured to homogenize the light, the light conducting means being optically coupled to the laser light generating means; and reflecting the homogenized light beam onto the inner surface of the tubular member to weld the inner surface by optically coupling a light reflecting means to the light conducting means and to the inner surface.

An object of the present invention is to provide a system and method for laser welding an inner surface of a tubular member, which tubular member may be a repair sleeve disposed in a nuclear heat exchanger heat transfer tube.

Another object of the present invention is to provide a laser beam that is precisely confined on the inner surface of the sleeve in order to suitably weld the sleeve.

A further object of the present invention is to provide a laser beam that has the desired high power density.

Yet another object of the present invention is to provide a reflecting mirror less susceptible to fouling by a weld plume produced during the welding process.

A feature of the present invention is the provision of a system for welding an inner surface of a tubular member, the system including light conducting means optically coupled to laser light generating means for conducting the laser light through the light conducting means, the light conducting means being configured to homogenize the light for emitting a homogenized light beam therefrom.

Another feature of the present invention is the provision of a method of welding an inner surface of a tubular member, the method comprising the step of emitting a homogenized light beam by conducting the light through light conducting means configured to homogenize the light.

A further feature of the present invention is the provision of a reflecting mirror canted at a predetermined angle with respect to the inner surface of the sleeve so that the mirror is less susceptible to fouling by the weld plume produced by the welding process.

An advantage of the present invention is that the sleeve is precisely welded over a confined relatively small predetermined area thereof for completely fusing the sleeve to the tube.

Another advantage of the present invention is that a spatially coherent laser light beam is provided for precisely welding the inner surface of the sleeve.

A further advantage of the present invention is that the useful life of the reflecting mirror is extended because the reflecting mirror is less susceptible to fouling by the weld plume produced during the welding process.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings wherein:

FIG. 3 shows in partial elevation light conducting means and light reflecting means disposed in the selected tube for laser welding the sleeve to the tube;

FIG. 4 is a view along section line 4—4 of FIG. 3;

FIG. 5 is a fragmentation view in partial elevation showing the light conducting means disposed in the sleeve;

DESCRIPTION OF THE PREFERRED EMBODIMENT

Figure 1:
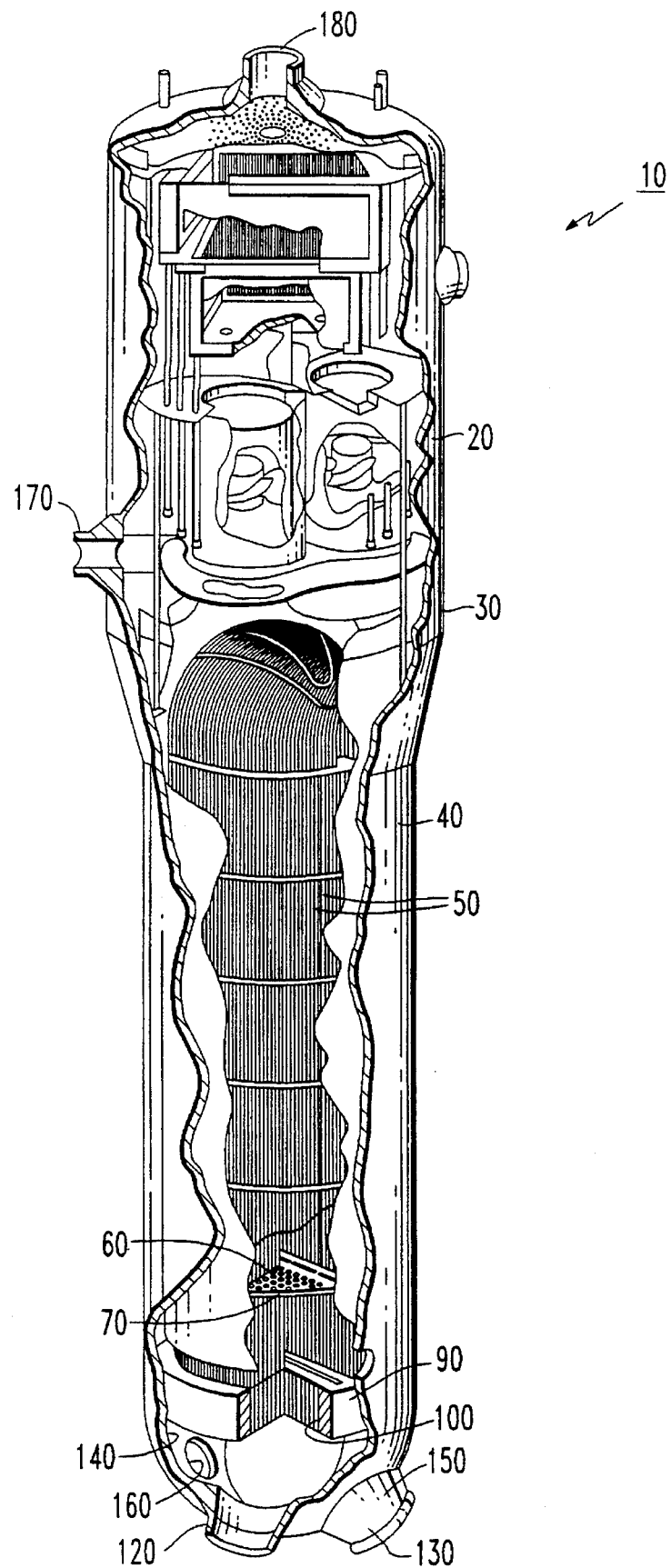
FIG. 1 shows in partial elevation a typical nuclear heat exchanger with parts removed for clarity, the heat exchanger having a plurality of U-shaped heat transfer tubes disposed therein.

Referring to FIG. 1, there is shown a typical nuclear heat exchanger or steam generator, generally referred to as 10, for generating steam. Heat exchanger 10 comprises a shell 20 having an upper portion 30 and a lower portion 40. Disposed in lower portion 40 are a plurality of vertically-oriented and inverted U-shaped heat transfer tubes 50 for circulating radioactive primary fluid (not shown) therethrough. Each tube 50 extends through its respective holes 60 formed in a plurality of horizontally-oriented support plates 70. Each tube 50 has an inside surface or inside diameter 80 (see FIG. 3). As shown in FIG. 1, disposed in lower portion 40 and attached thereto is a horizontally-oriented tubesheet 90 having a plurality of apertures 100 therethrough for receiving the end portions 110 of tubes 50. Disposed on shell 20 are a first inlet nozzle 120 and a first outlet nozzle 130 in fluid communication with an inlet plenum chamber 140 and an outlet plenum chamber 150, respectively. A plurality of manway openings 160 (only one of which is shown) are formed through shell 20 below tubesheet 100 for providing access to inlet plenum chamber 140 and outlet plenum chamber 150. Moreover, formed through shell 20 above tubes 50 is a second inlet nozzle 170 for allowing entry of a non-radio-active secondary fluid (not shown) into upper portion 30. A second outlet nozzle 180 is attached to the top of upper portion 30 for exit of the steam from heat exchanger 10.

During operation of heat exchanger 10, radioactive primary fluid, heated by a nuclear heat source (not shown), flows through first inlet nozzle 120, into inlet plenum chamber 140, and through tubes 50 to outlet plenum chamber 150 where the primary fluid exits heat exchanger 10 through first outlet nozzle 130. As the primary fluid enters inlet plenum chamber 140, the secondary fluid simultaneously enters second inlet nozzle 170 and flows into upper portion 30 to eventually surround tubes 50. A portion of this secondary fluid vaporizes into steam due to conductive heat transfer from the primary fluid to the secondary fluid, the conductive heat transfer occurring through the walls of tubes 50. The steam exits heat exchanger 10 through second outlet nozzle 180 and is piped to a turbine-generator set to generate electricity in a manner well known in the art.

However, due to tube wall intergranular cracking or degradation caused by stress and corrosion, some of the tubes 50 may not remain leaktight. If degradation is suspected, the tube 50, although degraded, may remain in service by sleeving the degraded portion (not shown) of the tube. As disclosed in detail hereinbelow, the system and method of the present invention is capable of suitably sleeving such a degraded tube by means of laser light energy.

Figure 2:
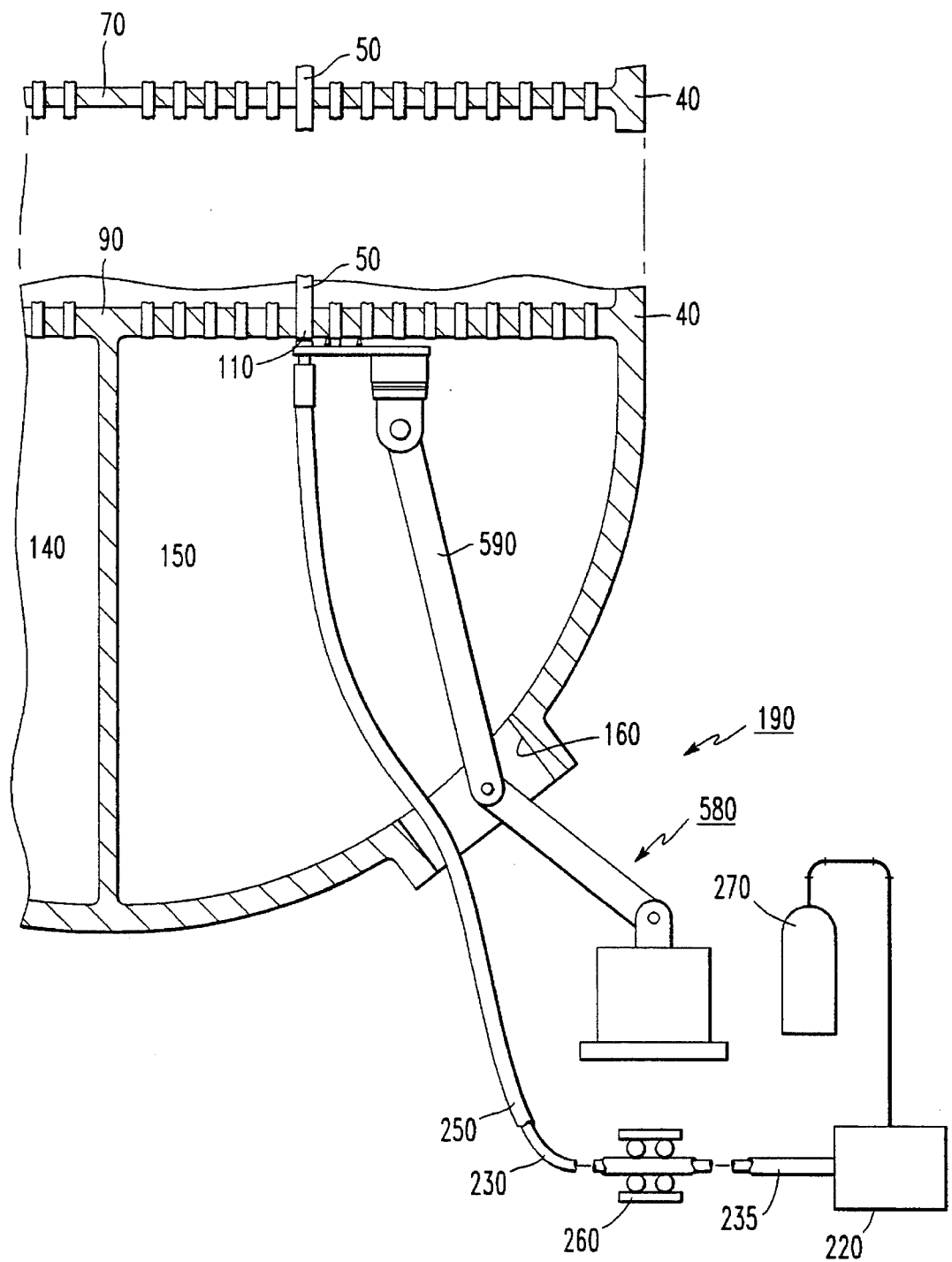
FIG. 2 illustrates the system of the invention in operative condition for welding a repair sleeve to the inside surface of a selected one of the tubes.
Figure 7:
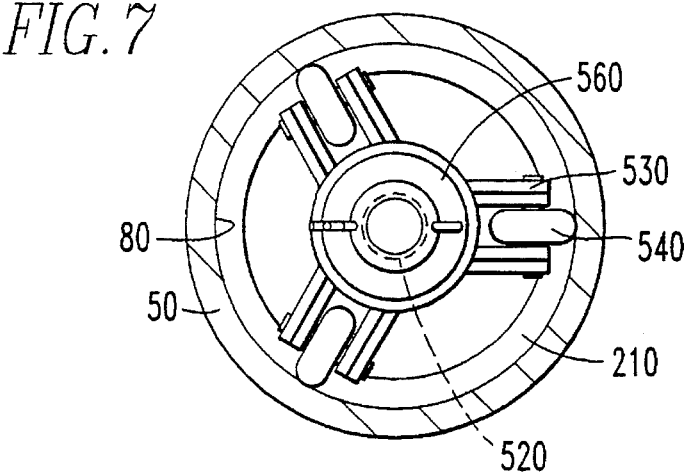
FIG. 7 is a view along section line 7—7 of FIG. 6.
Figure 6:
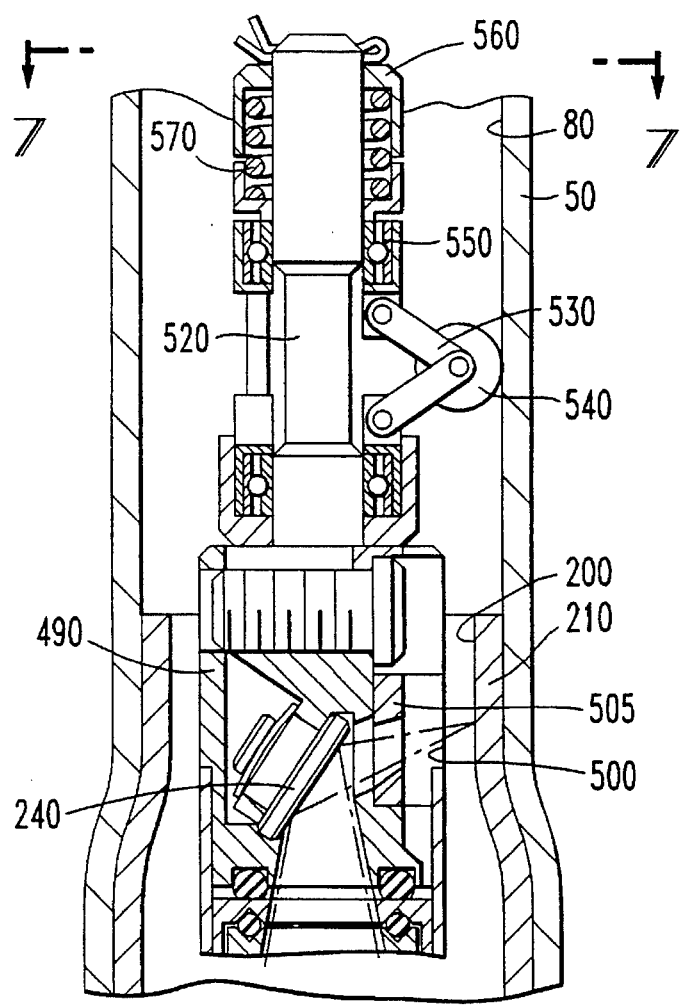
FIG. 6 shows in partial elevation the light reflecting means disposed in the sleeve.
Figure 8:
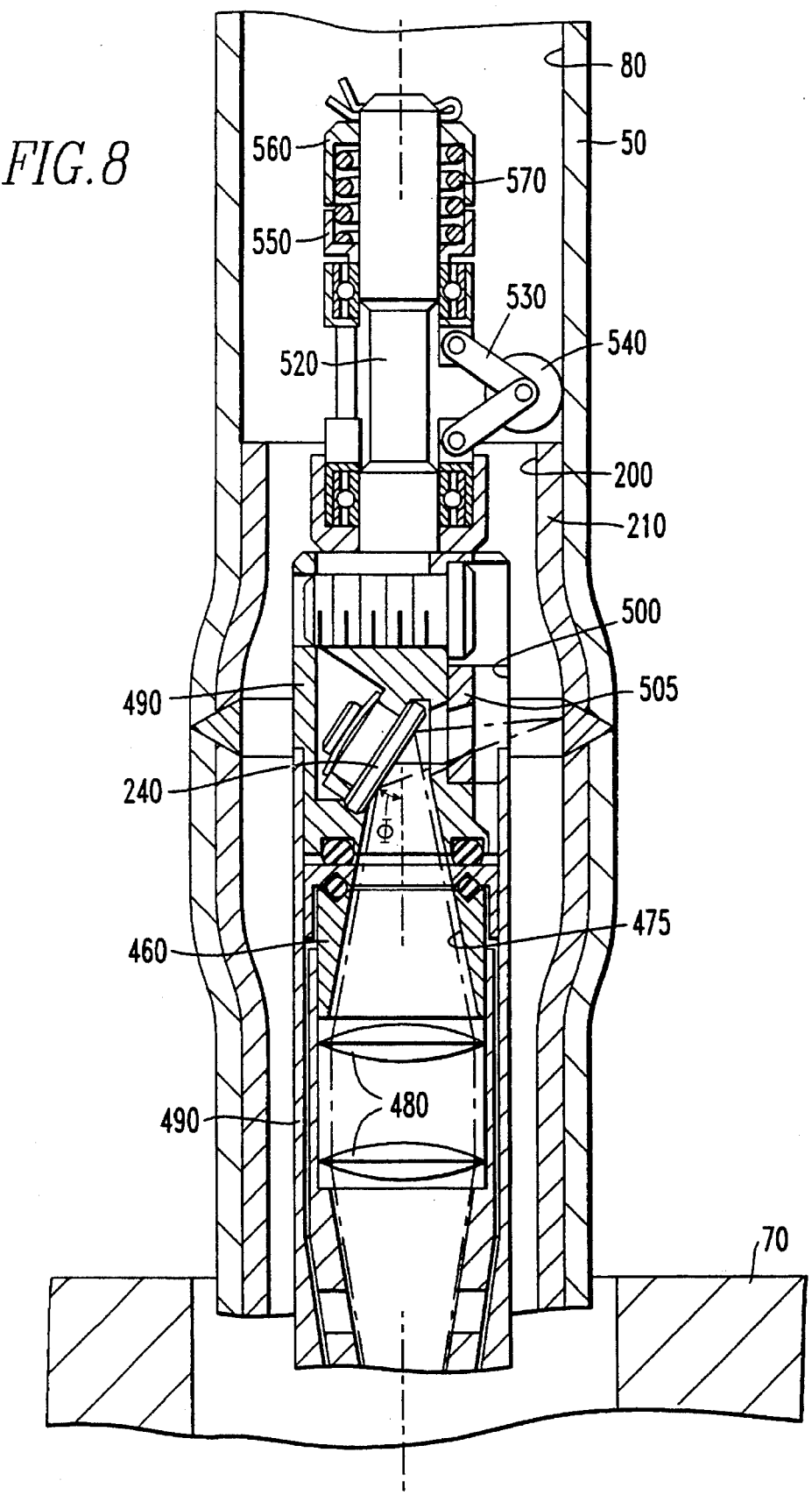
FIG. 8 is a fragmentation view in elevation showing a "homogenized" laser beam fusing the sleeve to the tube.
Figure 9:
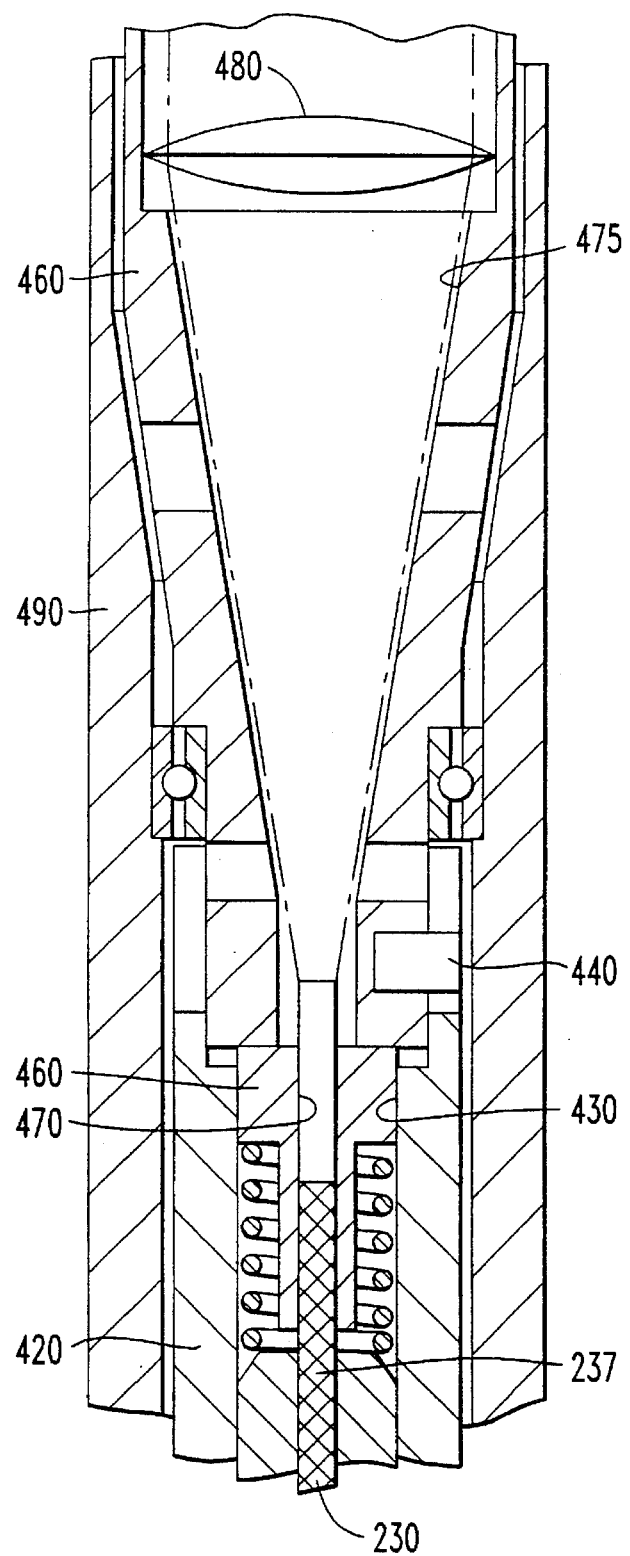
FIG. 9 is a fragmentation view in elevation of the "homogenized" laser beam being emitted by a fiber-optic cable belonging to the invention.

Therefore, referring to FIGS. 2 and 3, there is shown the subject matter of the present invention, which is a system, generally referred to as 190, for laser welding an inner surface or inner diameter 200 of a first tubular member, such as a sleeve 210, in order to affix or fuse sleeve 210 to inside surface or inside diameter 80 of a second tubular member (i.e., tube 50). In this manner sleeve 210 covers or sleeves the degraded portion of tube 50 so that tube 50 may remain in service although degraded.

Still referring to FIGS. 2 and 3, system 190 comprises laser light generating means, such as an Nd:YAG laser 220, for generating high intensity laser light sufficient to weld or fuse sleeve 210 to the inside surface 80 of tube 50 such that sleeve 210 and tube 50 are sealingly joined at the interface thereof. Laser 220 may be of the type such as is available from Lumonics Limited, located in Warwickshire, England. System 190 further comprises light conducting means, such as an elongate flexible fiber optic cable 230, optically coupled to laser 220 for conducting the laser light. Fiber-optic cable 230 may be made of silica optical fiber transparent to the electromagnetic spectrum of emission of laser 220 for suitably conducting the laser light therethrough. Fiber-optic cable 230 has a first end portion 235 in optical communication with laser 220 and a second end portion 237 for reasons described hereinbelow. As disclosed in more detail hereinbelow, fiber-optic cable 230 is configured to receive the light from laser 220 and "homogenize" the light for emitting a "homogenized" light beam therefrom. As contemplated herein, a "homogenized" light beam is a light beam having acceptable spatial coherency. In this regard, fiber-optic cable 230 has a generally S-shaped configuration or curvature or bend along a predetermined portion or length thereof to homogenize the light. It is important to homogenize the light beam in order to provide a laser light beam having acceptable spatial coherency which in turn provides a laser light beam having a relatively high power density. System 190 also comprises light reflecting means, such as a planer mirror 240, optically coupled to second end portion 237 of fiber-optic cable 230 for receiving the homogenized light beam emitted from second end portion 237 of fiber-optic cable 230. Mirror 240 may be polished copper, molybdenum, tungsten, copper coated with silver, or the like for providing a high reflectivity surface while simultaneously resisting oxidation. Planer mirror 240 is also optically coupled to inner surface 200 of sleeve 210 for reflecting the homogenized light beam onto inner surface 200. Mirror 240 has a predetermined orientation (i.e., canted at a predetermined angle "φ" of approximately 20° degrees) with respect to inner surface 200 to prevent fouling of mirror 240, which fouling may otherwise occur due to weld spatter and microscopic debris entrained in a weld plume (not shown) produced from inner surface 200 during the welding process.

Still referring to FIGS. 2 and 3, system 190 further comprises a flexible conduit 250 extending from laser 220 and into outlet plenum chamber 150 or inlet plenum chamber 140. Conduit 250 will extend into either inlet plenum chamber 140 or outlet plenum chamber 150 depending on the portion of tube 50 to be sleeved. Extending through conduit 250 is fiber-optic cable 230. Conduit 250 therefore surrounds fiber-optic cable 230 for protecting fiber-optic cable 230 from damage. Engaging conduit 250 is a conduit driver 260 for driving conduit 250 axially along inner diameter 200 of sleeve 210 and inside diameter 80 of tube 50, which sleeve 210 is concentrically disposed within tube 50. That is, conduit drive 260 is capable of advancing and withdrawing conduit 250 along the longitudinal axis of sleeve 210 and tube 50 for reasons disclosed hereinbelow. Moreover, in gas communication with the inside surface of conduit 250 is a pressurized shielding gas supply 270 for supplying shielding gas (e.g., nitrogen) to the weld zone of sleeve 210 at a flow rate of approximately 30–100 liters/minute.

Referring now to FIGS. 3, 4 and 5, conduit 250 is connected, such as by a connector 280, to a generally tubular housing 290. Housed in housing 290 is rotating means, such as a relatively small-sized motor assembly housing 300, connected to a gear box shaft or drive shaft 305 for rotating drive shaft 305. Motor assembly housing 300 houses a variable speed motor (not shown) that engages a gear arrangement or "gear box" (also not shown) that in turn engages drive shaft 305. An encoder (not shown) is electrically connected to the motor for controlling the operation of the motor. Controlling the operation of the motor in turn controls the rotation of drive shaft 305, as more precisely described hereinbelow. Moreover, electrical conducting wires (not shown) are connected to the motor for activating the motor and other electrical conducting wires (not shown) are connected to the encoder for activating the encoder. Motor assembly housing 300 has a longitudinally extending "flat" side 302 therealong for matingly receiving fiber-optic cable 230 and also a groove 303 formed in "flat" side 302 for passage of a suitable shielding gas therethrough. Motor assembly housing 300 may be of the type that is available from Micro Mo located in St. Petersburg, Fla. Mounted atop motor assembly housing 300 is a gear assembly, generally referred to as 310 for reasons disclosed hereinbelow. Gear assembly 310 includes an elongate generally cylindrical first support member 320 having a first end portion 330 and a second end portion 340. First end portion 330 has a bore 350 for receiving drive shaft 305 therethrough and also has a through-way channel 355 defining a generally S-shaped curvature for reasons disclosed hereinbelow. Moreover, formed in first support member 320 is a cavity 360 for receiving an elongate axle 370 therein. Axle 370 has a first end 380 connected, such as by a first universal joint 385, to drive shaft 305, so that axle 370 rotates as drive shaft 305 rotates. Axle 370 also has a second end 382 connected, such a by a second universal joint 387, to a rotatable drive gear 400, so that drive gear 400 rotates as axle 370 rotates. Axle 370 is inclined with respect to the center axis of drive shaft 305 so that the velocity of rotation and the torque at second universal joint 387 is substantially identical to the velocity of rotation and the torque at first universal joint 385. In this manner, the rotational velocity or speed of drive gear 400 and driven gear 410 is substantially equal to the rotational velocity or speed of drive shaft 305. As described more fully hereinbelow, the speed at which the circumferential weldment is formed around inner diameter 200 of sleeve 210 is equal to the rotational speed of drive gear 400 and driven gear 410. It will be appreciated from the description hereinabove, that the encoder controls the speed at which the circumferential weldment is formed around inner diameter 200 of sleeve 210 because the encoder controls the operation of the motor which in turn controls the rotational speed of drive gear 400 and driven gear 410. Applicant has discovered that controlling the speed at which the circumferential weldment is formed is important. This is important because the speed at which the circumferential weldment is formed is an important parameter determining the extent of fusion between sleeve 210 and tube 50.

Still referring to FIGS. 3, 4 and 5, drive gear 400 engages a driven gear 410 which surrounds and is affixed to first support member 320, as best seen in FIG. 3. Thus, it will be appreciated from the description hereinabove, that first support member 320 supports shaft 370, drive gear 400 and driven gear 410. Surrounding second end portion 350 of first support member 320 and connected thereto, such as by a first anti-rotation pin 415, is a generally cylindrical second support member 420 having a bore 430 therethrough. Fiber-optic cable 230 is received in groove 303, extends through channel 355 and through bore 430.

Referring to FIGS. 3, 4, 5, 6, 7 and 8, connected, such as by a second antirotation pin 440, to and supported by second support body 420 is an optics assembly, generally referred to as 450, for focusing and then reflecting the homogenized laser beam emitted from fiber-optic cable 230. Optics assembly 450 comprises a generally tubular lens housing 460 which is connected to second support body 420 by second anti-rotation pin 440. Lens housing 460 has a bore 470 for receiving fiber-optic cable 230 therethrough and also has an open chamber 475 formed therein for housing at least one lens 480. By way of example only, and not by way of limitation, lens 480 may be made of zinc selenide, quartz, fused silica, potassium chloride, sodium chloride, potassium bromide, or the like, for providing an oxidation-resistant transparent focusing medium for the laser beam. Lens 480 focuses the laser beam emitted by fiber-optic cable 230 onto mirror 240. Moreover, surrounding and attached to lens housing 460 is a generally tubular enclosure 490 for enclosing mirror 240. As disclosed in more detail hereinbelow, mirror 240 is oriented or canted at a predetermined angle of approximately 10° to 20° with respect to inner surface 200 to avoid fouling or disposition on mirror 240 of weld spatter and microscopic weld debris entrained in the weld plume produced during the welding process. In this manner, the useful life of mirror 240 is substantially extended. More specifically, applicant has discovered that canting mirror at approximately 20° with respect to inner side surface 200 of sleeve 210 roughly doubles the useful life of mirror 240 by avoiding substantial fouling thereof. By contrast, prior art mirrors are more susceptible to such fouling because they are typically canted at 0° to 10°.

Still referring to FIGS. 3, 4, 5, 6, 7 and 8, enclosure 490 has a port 500 cut through the wall thereof and aligned with the center portion of planer mirror 240 for passage of the laser beam through port 500. Moreover, attached to enclosure 490 and adjacent to port 500 is a replaceable insert 505 for reasons disclosed immediately hereinbelow. In this regard, a problem in the art is that the area surrounding port 500 may inadvertently intercept the laser light beam in such a manner that it is undesirably damaged by the light beam. According to the invention, the problem is solved by applicant's insert 505 which, even if damaged by the light beam, can be readily replaced. In this manner, enclosure 490 is protected from damage. In addition, mounted atop enclosure 490 and connected thereto is centering means, generally referred to as 510, for centering the laser weld head within sleeve 210 and tube 50. Centering means 510 comprises a support shaft 520 adapted to support at least one pair of link members 530 having a roller 540 connected thereto, roller 540 being capable of slidably engaging inside surface 80 of tube 50. Slidably surrounding support shaft 520 is a sliding ring member 550 spaced-apart from a fixed ring member 560, which is affixed to support shaft 520. A compression spring 570 is interposed between sliding ring member 550 and fixed ring member 560 for downwardly biasing sliding ring member 550. One of the link members 530 has an end thereof attached to sliding ring member 550 and the other end thereof attached to roller 540. The other one of link members 530 has one end thereof attached to support shaft 520 and the other end thereof attached to roller 540. Link members 530, ring members 550/560 and spring 570 coact to allow roller 540 to adjustably outwardly extend into sliding engagement with inside surface 80 of tube 50, so that the weld head can be centered within tubes of differing diameters. Moreover, centering means 510 is capable of centering optics assembly 450 within sleeve 210 so that it is concentrically disposed within tube 50. It is important to center optics assembly 450 within sleeve 210 in order to precisely focus the laser beam onto inner surface 200 of sleeve 210 for precisely fusing sleeve 210 to tube 50.

As best seen in FIG. 3, fiber-optic cable 230 matingly conforms to the curvature of channel 355 that is formed in first support member 320, which channel 355 has the previously mentioned generally S-shaped curvature or bend. Thus, fiber-optic cable 230 obtains a generally S-shaped configuration or curvature as it extends through channel 355 of first support member 320. This is important in order to "homogenize" the laser light being conducted through fiber-optic cable 230 in the manner disclosed more fully hereinbelow.

In this regard, applicant has discovered that the geometrical configuration of fiber-optic cable 230 determines the spatial coherency or homogeneity of the laser beam emitted therefrom. A non-homogeneous light beam would obtain a light beam having, for example, a center portion thereof devoid of light or concentric ring portions devoid of light. More specifically, applicant's fiber-optic cable 230 is foraged into a predetermined generally S-shaped configuration that ensures a spatially coherent or homogeneous light beam. In addition, this generally S-shaped configuration of fiber-optic cable 230 allows the use of a small-sized readily commercially available motor, gear box and encoder with the required length of fiber-optic cable.

Returning to FIG. 2, system 190 further comprises a remotely operable manipulator, generally referred to as 580, having a manipulator arm 590 in cooperative association with housing 290 for manipulating housing 290 into coaxial alignment with inner diameter 200 of sleeve 210. In this regard, manipulator 580 may be a suitable robotic device, such as a ROSA (Remotely Operated Service Arm) available from the Westinghouse Electric Corporation located in Pittsburgh, Pa. In addition, a probe 600, which may be an eddy current probe or an ultrasonic probe, is attached to connector 280 for locating the bottom end of sleeve 210 in order to position the weld head within sleeve 210. Moreover, connector 280 may have a flow channel 610 therein for conducting a fluid (e.g., the shielding gas) to a radially expandable bladder 620 surrounding connector 280. Bladder 620 is capable of radially expanding into intimate engagement with inside surface 80 of tube 50 to secure the weld head to inside surface 80 so that the weld head does not axially move during welding of sleeve 210. Preventing axial movement of the weld head assists in precisely welding sleeve 210 at a predetermined axial location thereof.

The weld head disclosed hereinabove is particularly useful for fusing sleeve 210 to the tube 50 having a relatively small inner diameter 80. By way of example only and not by way of limitation, the weld head of the present invention may have an outermost diameter of approximately 0.512 inch for fusing sleeve 210 to the tube 50, which may have a relatively small inner diameter of approximately 0.750 inch. Moreover, the outer-most diameter of the motor, gear box and encoder may each be approximately 10 mm. for fitting within motor assembly housing 300 which in turn is sized to pass through the relatively small inner diameter 80 of tube 50 and the relatively small inside diameter 200 of sleeve 210.

OPERATION

Heat exchanger 10 is removed from service in a manner customarily used in the art and system 190 is disposed sufficiently near heat exchanger 10 to perform the required laser welding. Of course, sleeve 210 has been previously expanded into engagement with tube 50 to connect sleeve 210 to tube 50. Sleeve 210 is positioned within tube 50 in such a manner as to cover or bridge a degraded portion of tube 50. However, the elastic properties of sleeve 210 may cause sleeve 210 to experience "spring back" after expansion. This phenomenon of "spring back" will in turn cause a relatively small gap to exist at the sleeve-to-tube interface. Such a gap will define a flow path for the primary fluid between sleeve 210 and tube 50 and through the degraded portion of tube 50, which flow path may allow the primary fluid to undesirably commingle with the secondary fluid. Therefore, it is desirable to seal the gap in the manner disclosed more fully hereinbelow.

In this regard, housing 290 is connected to manipulator arm 590 and manipulator 580 is caused to extend manipulator arm 590 into outlet plenum chamber 150 or into inlet plenum chamber 140, depending on the portion of tube 50 to be sleeved. Conduit driver 260 is operated to drive conduit 250 and fiber-optic cable 230 associated therewith axially along inside surface 80 of tube 50 and inner surface 200 of sleeve 210. Probe 600 is simultaneously activated for precisely locating the bottom end of sleeve 210 in order to position the weld head adjacent the portion of sleeve 210 to be welded.

Laser 220 is activated to emit laser light into the first end portion 235 of fiber-optic cable 230. As the laser light is conducted through fiber-optic cable 230, it will encounter the bent or S-shaped portion of fiber-optic cable 230 and become homogenized into a spatially coherent laser light beam. The S-shaped curvature of fiber-optic cable 230 is such that the laser light ricochets off wall 235. Multiple impingements of the laser light with the inner wall 235 of fiber-optic cable 230 will cause the laser light to become less diffused and more coherent in order to produce a "homogenize" laser light beam. The homogenized light beam will then exit second end portion 237 of fiber-optic cable 230 and travel through lens 480 for focusing the light beam onto mirror 240 which reflects the light beam through port 500. After passing through port 500, the light beam will be intercepted by inner surface 200 of sleeve 210 for fusing sleeve 210 to inside diameter 80 of tube 50 in order to seal the previously mentioned gap and to sealingly affix sleeve 210 to tube 50.

Moreover, system 190 is capable of fusing sleeve 210 to tube 50 around the circumference thereof. In this regard, motor assembly housing 300 is operated for rotating axle 370 which in turn rotates drive gear 400. As drive gear 400 rotates, driven gear 410 rotates to a like extent for rotating second support body 420. As second support body rotates, lens housing 460 rotates to a like extent for rotating mirror 240 which is affixed to and housed within housing 460. As mirror 240 and housing 460 simultaneously rotate, the light beam reflected from mirror 240 and through port 500 circumscribes sleeve 210 for continuously circumferentially fusing sleeve 210 to inside surface 80 of tube 50. In a like manner, multiple spaced-apart weldments may be caused to circumscribe sleeve 210, if desired.

However, the weldment produced by the method of the invention should be impurity-free so that it is not susceptible to stress corrosion cracking. Therefore, the shielding gas is caused to flow over that portion of inner surface 200 being welded to prevent oxidation of the weld zone and to prevent impurities from migrating into the weld zone (i.e., that portion of sleeve 210 being welded). Moreover, supplying shielding gas to the vicinity of the weld zone tends to blow any weld plum (not shown) away from mirror 240 to prevent fouling of mirror 240. As added assurance that the weld plum will not foul mirror 240, the mirror 240 is canted at an angle of approximately 20° with respect to inner surface 200 of sleeve 210 in order to substantially avoid or block contact of mirror 240 with any weld plum. Avoiding fouling of mirror 240 increases the useful life of mirror 240.

After the required number of tubes 50 are sleeved, system 190 is removed from the vicinity of heat exchanger 10 and heat exchanger 10 is then returned to service.

It will be appreciated from the description hereinabove that an advantage of the present invention is that the sleeve is precisely welded over a relatively small confined area thereof for suitably fusing the sleeve to the tube. It will be further appreciated from the description hereinabove that another advantage of the present invention is that a spatially coherent laser light beam of relatively high power density is provided for precisely welding the inner surface of the sleeve. In addition, it will be appreciated from the description provided hereinabove that yet another advantage of the present invention is that the useful life of the reflecting mirror is extended because the reflecting mirror is canted so that it is less susceptible to fouling by the weld plume produced during the welding process.

Although the invention is illustrated and described herein in its preferred embodiment, it is not intended that the invention as illustrated and described be limited to the details shown, because various modifications may be obtained with respect to the invention without departing from the spirit of the invention or the scope of equivalents thereof. For example, a $CO_2$ laser may be used rather than the Nd:YAG laser if higher power densities are desired. As another example, the weld head may be axially translated in tube 50 as mirror 240 simultaneously rotates to provide a helically extending weldment on inner surface 200 of sleeve 210. A helically extending weldment provides increased assurance that sleeve 210 is sealingly fused to tube 50.

Therefore, what is provided is a system and method for laser welding an inner surface of a tubular member, which tubular member may be a repair sleeve disposed in a nuclear heat exchanger heat transfer tube.

What is claimed is:

1. A system for welding an inner surface of a tubular member, said system having having a longitudinal axis, comprising:

(a) laser light generating means for generating high intensity laser light;

(b) light conducting means optically coupled to said laser light generating means for conducting the laser light through said light conducting means, said light conducting means configured to homogenize the light for emitting a homogenized light beam therefrom; and (c) light reflecting means optically coupled to said light conducting means for receiving the homogenized light beam emitted from said light conducting means and optically coupled to the inner surface of the tubular member for reflecting the light beam onto the inner surface to weld the inner surface, said light reflecting means including a mirror having a predetermined orientation of between approximately 10° to 20° with respect to the longitudinal axis of the system to prevent fouling of said mirror as the inner surface is welded.

2. The system of claim 1, wherein said light conducting means comprises a fiber-optic cable having a generally S-shaped configuration for homogenizing the laser light.

3. The system of claim 1, further comprising rotating means connected to said light reflecting means for rotating said light reflecting means to weld around the inner surface.

4. A system for welding an inner diameter of a first tubular member disposed in an inside diameter of a second tubular member to fuse the first tubular member to the second tubular member, said system having a longitudinal axis, comprising:

(a) a laser for generating high intensity laser light sufficient to fuse the first tubular member to the second tubular member;

(b) a fiber-optic cable optically coupled to said laser for conducting the laser light through said fiber-optic cable, said fiber-optic cable configured to homogenize the light so that said fiber-optic cable emits a homogenized light beam therefrom;

(c) a housing sized to be disposed in the inner diameter of the first tubular member; and (d) a reflector mounted on said housing, said reflector optically coupled to said fiber-optic cable for receiving the homogenized light beam emitted from said fiber-optic cable and optically coupled to the inner diameter of the first tubular member for reflecting the homogenized light beam onto the inner diameter of the first tubular member to weld the first tubular member to the second tubular member, whereby the first tubular member is fused to the second tubular member as the first tubular member is welded to the second tubular member, said reflector including a mirror having a predetermined orientating of between approximately 10° and 20° with respect to the longitudinal axis of the system to prevent fouling of said mirror as the inner diameter is welded.

5. The system of claim 4, wherein said fiber-optic cable has a predetermined generally S-shaped configuration so that said fiber-optic cable homogenizes the light.

6. The system of claim 4, further comprising a rotator housed in said housing and connected to said reflector for rotating said reflector to weld around the inner diameter of the first tubular member.

7. The system of claim 4, further comprising a conduit connected to said housing for moving said housing axially along the inner diameter of the first tubular member.

8. The system of claim 7, further comprising a conduit driver engaging said conduit for driving said conduit axially along the inner diameter of the first tubular member, whereby said housing moves axially along the inner diameter of the first tubular member as said conduit driver drives said conduit.

9. The system of claim 8, further comprising a manipulator connected to said housing for manipulating said housing into coaxial alignment with the first tubular member.

10. The system of claim 9, further comprising a shielding gas supply in gas communication with the inner diameter of the first tubular member for supplying a shielding gas to the inner diameter to exclude impurities from the inner diameter so that an impurity-free weldment is formed.

11. The system of claim 10, further comprising a probe connected to said housing for identifying the location of a portion of the inner diameter to be welded.

12. For use in a nuclear heat exchanger having a plurality of heat transfer tubes disposed therein, at least one of the tubes having an inside diameter surrounding a tubular sleeve having an inner diameter, the inner diameter having a circumferentially extending portion thereof defining a weld zone to be welded, a system for welding the inner diameter at the weld zone to fuse the sleeve to the inside diameter of the tube, the system comprising:

(a) a laser for generating high intensity laser light sufficient to fuse the sleeve to the inside diameter of the tube;

(b) an elongate fiber-optic cable for conducting the laser light through said fiber-optic cable, said fiber-optic cable having a first end optically coupled to said laser and a second end, said fiber-optic cable having a predetermined generally S-shaped configuration to homogenize the light so that said fiber-optic cable emits a homogenized light beam therefrom as the fiber-optic cable conducts the light;

(c) a tubular housing sized to be disposed in the inner diameter of the sleeve, said housing adapted to receive the second end of the fiber-optic cable;

(d) a planer mirror mounted atop said housing, said mirror optically coupled to the second end of said fiber-optic cable for receiving the light beam emitted from said fiber-optic cable and optically coupled to the weld zone for reflecting the light beam received thereby onto the weld zone, said mirror being canted at a predetermined angle of between 10° to 20° with respect to the weld zone to prevent fouling of said mirror as the weld zone is welded;

(e) a rotator housed in said housing and connected to said mirror for rotating said mirror to weld around the weld zone, said rotator including:
  (i) an elongate axle having a first end and a second end;
  (ii) a motor engaging the first end of said axle for rotating said axle;
  (iii) a rotatable drive gear attached to the second end of said axle, so that said drive gear rotates as said axle rotates;
  (iv) a rotatable driven gear engaging said drive gear and connected to said mirror so that said driven gear rotates as said drive gear rotates and so that said mirror rotates as said driven gear rotates; and (f) a probe connected to said housing for identifying the location of the weld zone, whereby the homogeneous light beam is emitted as said S-shaped fiber-optic cable conducts the light generated by said laser, whereby the light beam is received by the mirror as said fiber-optic cable conducts the light, whereby said mirror reflects the light beam onto the weld zone as the light beam is received by the mirror, whereby the weld zone is welded therearound as said rotator rotates said mirror, and whereby the sleeve is fused to the inside diameter of the tube as the weld zone is welded.

13. The system of claim 12, further comprising:

(a) a flexible conduit connected to said housing for moving said housing axially along the inner diameter of the sleeve, said conduit having said fiber-optic cable extending therethrough for protecting said fiber optic cable from damage; and (b) a conduit driver engaging said cable for driving said cable, whereby said cable moves said housing axially along the inner diameter of the sleeve as said conduit driver drives said cable.

14. The system of claim 13, further comprising a remotely operable manipulator connected to said housing for manipulating said housing into coaxial alignment with the inner diameter of the sleeve.

15. The system of claim 14, further comprising a shielding gas supply in gas communication with the weld zone for supplying a shielding gas covering the weld zone to exclude impurities from the weld zone so that the light beam forms an impurity-free weldment.

16. A method of welding an inner surface of a tubular member having a longitudinal axis, comprising the steps of:

(a) generating high intensity laser light by operating laser light generating means;

(b) emitting a homogenized light beam by conducting the light through light conducting means configured to homogenize the light, the light conducting means being optically coupled to the laser light generating means; and (c) reflecting the homogenized light beam onto the inner surface of the tubular member to weld the inner surface by optically coupling light reflecting means to the light conducting means and to the inner surface, said step of reflecting the light beam including the step of preventing fouling of the light reflecting means by orienting the light reflecting means between approximately 10° and 20° with respect to the longitudinal axis of the tubular member.

17. The method of claim 16, further comprising the step of welding around the inner surface by operating rotating means connected to the light reflecting means for rotating the light reflecting means.

18. A method of welding an inner diameter of a first tubular member disposed in an inside diameter of a second tubular member to fuse the first tubular member to the inside diameter of the second tubular member, the first tubular member having a longitudinal axis, comprising the steps of:

(a) generating high intensity laser light sufficient to weld the first tubular member to the inside diameter of the second tubular member by operating a laser;

(b) emitting a homogenized light beam by conducting the light through a fiber-optic cable configured to homogenize the light as the light is conducted through the fiber-optic cable, the fiber-optic cable being optically coupled to the laser;

(c) providing a housing sized to be disposed in the inner diameter of the first tubular member; and (d) reflecting the homogenized light beam onto the inner diameter of the first tubular member to weld the inner diameter of the first tubular member by mounting a reflector onto the housing and simultaneously optically coupling the reflector to the fiber-optic cable and to the inner diameter of the first tubular member, whereby the first tubular member is fused to the inside diameter of the second tubular member as the first tubular member is welded, said step of reflecting the light beam including the step of preventing fouling of the reflector by orienting the reflector at a predetermined angle of between approximately 10° and 20° with respect to the longitudinal axis of the first tubular member.

19. The method of claim 18, further comprising the step of welding around the inner diameter of the first tubular member by operating a rotator housed in the housing and connected to the reflector for rotating the reflector.

20. The method of claim 18, further comprising the step of moving the housing axially along the inner diameter of the first tubular member, the housing having a flexible conduit connected thereto.

21. The method of claim 20, wherein said step of moving the housing axially along the inner diameter of the first tubular member comprises the step of driving the conduit axially along the inner diameter of the first tubular member by operating a conduit driver engaging the cable.

22. The method of claim 21, further comprising the step of manipulating the housing into coaxial alignment with the inner diameter of the first tubular member by operating a manipulator connected to the housing.

23. The method of claim 22, further comprising the step of providing an impurity-free weldment by excluding impurities from the inner diameter of the first tubular member by supplying a shielding gas to the inner diameter.

24. The method of claim 23, further comprising the step of identifying the location of a portion of the first tubular member to be welded by energizing a probe connected to the housing as the housing axially moves along the inner diameter of the first tubular member.

25. In a nuclear heat exchanger having a plurality of heat transfer tubes disposed therein, at least one of the tubes having an inside diameter surrounding a tubular sleeve having an inner diameter, the inner diameter having a circumferentially extending portion thereof defining a weld zone to be welded, a method of welding the inner diameter at the weld zone to fuse the sleeve to the inside diameter of the tube, the method comprising the steps of:

(a) generating high intensity laser light sufficient to weld the inner diameter of the sleeve by operating a laser;

(b) emitting a homogenized light beam by conducting the light through an elongate fiber-optic cable configured to homogenize the light as the light is conducted through the fiber-optic cable, the fiber-optic cable having a predetermined generally S-shaped configuration to homogenize the light, the fiber optic cable having a first end optically coupled to the laser and a second end;

(c) providing a tubular housing sized to be disposed in the inner diameter of the sleeve, the housing adapted to receive the second end of the fiber-optic cable;

(d) reflecting the homogenized light beam onto the weld zone to weld the weld zone by mounting a planer mirror atop the housing and simultaneously optically coupling the mirror to the second end of the fiber-optic cable and to the weld zone;

(e) orienting the mirror at a predetermined angle of between 10° to 20° with respect to the inner diameter of the sleeve to prevent fouling of the mirror as the weld zone is welded;

(f) welding around the weld zone by operating a rotator housed in the housing and connected to the mirror for rotating the mirror; and (g) identifying the location of the weld zone to be welded by energizing a probe connected to the housing.

26. The method of claim 25, further comprising the step of moving the housing axially along the inner diameter of the sleeve, the housing having a cable connected thereto.

27. The method of claim 26, wherein said step of moving the housing axially along the inner diameter of the sleeve comprises the steps of:

(a) manipulating the housing into coaxial alignment with the inner diameter of the sleeve by remotely operating a manipulator connected to the housing; and (b) moving the cable axially along the inner diameter of the sleeve by operating a conduit driver engaging the cable.

28. The method of claim 27, further comprising the step of providing an impurity-free weldment by excluding impurities from the weld zone by supplying a shielding gas to the weld zone.

* * * * *